(12) United States Patent
Bullard et al.

(10) Patent No.: US 9,750,265 B1
(45) Date of Patent: Sep. 5, 2017

(54) CARCASS FINISH CABINET WITH SPRAY ARBORS AND METHODS THEREOF

(71) Applicant: Zee Company, Inc., Chattanooga, TN (US)

(72) Inventors: Robert C. Bullard, Signal Mountain, TN (US); Jonathon R. Bullard, Chattanooga, TN (US); George Beason, Chattanooga, TN (US); James A. Faller, Chattanooga, TN (US)

(73) Assignee: Zee Company, Inc., Chattanooga, TN (US)

( * ) Notice: Subject to any disclaimer, the term of this patent is extended or adjusted under 35 U.S.C. 154(b) by 0 days.

(21) Appl. No.: 15/053,418

(22) Filed: Feb. 25, 2016

Related U.S. Application Data

(60) Provisional application No. 62/198,796, filed on Jul. 30, 2015.

(51) Int. Cl.
*A22C 17/00* (2006.01)
*A22C 17/08* (2006.01)
(Continued)

(52) U.S. Cl.
CPC .............. *A22C 17/08* (2013.01); *A23B 4/12* (2013.01); *A23B 4/30* (2013.01)

(58) Field of Classification Search
CPC ......... A22C 17/16; A22C 17/14; A22C 17/08; A22C 21/061; A22C 25/02; A22B 5/08; A22B 5/00082
(Continued)

(56) References Cited

U.S. PATENT DOCUMENTS 4,279,059 A * 7/1981 Anderson ................ A22B 5/08
452/173
5,069,922 A 12/1991 Brotsky et al.
(Continued)

FOREIGN PATENT DOCUMENTS

GB 947688 1/1964
WO WO 99/00025 1/1999
(Continued)

OTHER PUBLICATIONS

Mohan et al. Role of Peroxyacetic Acid, Octanoic Acid, Malic Acid, and Potassium Lactate on the Microbiological and Instrumental Color Characteristics of Ground Beef, J. Food Science, vol. 77, No. 4, 2012, pp. M188-M193.
(Continued)

*Primary Examiner* — Richard Price, Jr.
(74) *Attorney, Agent, or Firm* — Patterson Thuente Pedersen, P.A.

(57) ABSTRACT

A carcass washing cabinet having a plurality of spray arbors having a desired spray performance, which can rinse a carcass side with a reduced fluid flow rates through the spray arbors. The reduced fluid flow rates and increased pressure reduces volumes of water and/or other rinsing chemicals as well as by treating lower volumes of liquid waste that are generated by the carcass wash cabinets. Methods of rinsing carcasses with an apparatus having the plurality of arbors with high pressure nozzles and lower flow rates reduces water and/or chemical consumption without affecting microbial load reduction.

20 Claims, 10 Drawing Sheets

(51) Int. Cl.
*A23B 4/30* (2006.01)
*A23B 4/12* (2006.01)

(58) Field of Classification Search
USPC .................................................. 452/123, 173
See application file for complete search history.

(56) References Cited

U.S. PATENT DOCUMENTS

| | | | |
|---|---|---|---|
| 5,143,739 | A | 9/1992 | Bender et al. |
| 5,200,189 | A | 4/1993 | Oakes et al. |
| 5,234,703 | A | 8/1993 | Guthery |
| 5,364,650 | A | 11/1994 | Guthery |
| 5,435,808 | A | 7/1995 | Holzhauer et al. |
| 5,484,332 | A * | 1/1996 | Leech ............... A23B 4/26 452/173 |
| 5,489,434 | A | 2/1996 | Oakes et al. |
| 5,632,676 | A | 5/1997 | Kurschner et al. |
| 5,635,231 | A | 6/1997 | Bender et al. |
| 5,882,253 | A * | 3/1999 | Mostoller .......... A22C 21/0061 452/173 |
| 5,938,519 | A * | 8/1999 | Wright ............... A22C 21/04 452/173 |
| 6,010,729 | A | 1/2000 | Gutzmann et al. |
| 6,103,286 | A | 8/2000 | Gutzmann et al. |
| 6,113,963 | A | 9/2000 | Gutzmann et al. |
| 6,183,807 | B1 | 2/2001 | Gutzmann et al. |
| 6,514,556 | B2 | 2/2003 | Hilgren et al. |
| 6,545,047 | B2 | 4/2003 | Gutzmann et al. |
| 6,627,593 | B2 | 9/2003 | Hei et al. |
| 6,964,788 | B2 | 11/2005 | Phebus et al. |
| 7,754,670 | B2 | 7/2010 | Lange et al. |
| 7,887,641 | B2 | 2/2011 | Man et al. |
| 8,012,002 | B2 * | 9/2011 | Brown ............... A22B 5/0082 452/173 |
| 8,020,520 | B2 | 9/2011 | Hilgren et al. |
| 8,029,693 | B2 | 10/2011 | Dada et al. |
| 8,030,351 | B2 | 10/2011 | Gutzmann et al. |
| 8,043,650 | B2 | 10/2011 | Gutzmann et al. |
| 8,128,976 | B2 | 3/2012 | Man et al. |
| 8,246,429 | B2 * | 8/2012 | Hilgren ............. A22C 21/0061 452/123 |
| 8,684,799 | B2 * | 4/2014 | Brink ................ A22C 21/0061 452/173 |
| 2003/0211169 | A1 | 11/2003 | Tabasso |
| 2006/0113506 | A1 | 6/2006 | Man et al. |
| 2009/0043123 | A1 | 2/2009 | Copenhafer et al. |
| 2009/0145859 | A1 | 6/2009 | Man et al. |
| 2010/0196503 | A1 | 8/2010 | Heisig et al. |
| 2010/0227000 | A1 | 9/2010 | Ames et al. |
| 2011/0027383 | A1 | 2/2011 | Hilgren et al. |
| 2011/0135534 | A1 | 6/2011 | Bates et al. |
| 2011/0177145 | A1 | 7/2011 | Erkenbrecher, Jr. et al. |
| 2011/0220155 | A1 | 9/2011 | Man et al. |
| 2011/0305805 | A1 | 12/2011 | Gutzmann et al. |
| 2011/0311691 | A1 | 12/2011 | Gutzmann et al. |
| 2012/0244261 | A1 | 9/2012 | Harvey et al. |
| 2012/0245228 | A1 | 9/2012 | Harvey et al. |

FOREIGN PATENT DOCUMENTS

| | | |
|---|---|---|
| WO | WO 02/054866 A1 | 7/2002 |
| WO | WO 2009/027857 A1 | 3/2009 |

OTHER PUBLICATIONS

Quilo et al., "Microbial, instrumental color and sensory characteristics of inoculated ground beef produced using potassium lactate, sodium metasilicate or peroxyacetic acid as multiple antimicrobial interventions", Meat Science, 84, 2010, pp. 470-476.

Harris et al., "Microbiological and organoleptic characteristics of beef trim and ground beef treated with acetic acid, lactic acid, acidified sodium chlorite, or sterile water in a simulated commercial processing environment to reduce *Escherichia coli* O157:H7 and *Salmonella*", Meat Science, 90, 2012, pp. 783-788.

Bell, "Reduction of doodborne mirco-organisms on beef carcass tissue using acetic acid, sodium bicarbonate, and hydrogen peroxide spray washes", Food Microbiology (1997), 14, 439-448.

Labadie, "Development of a New Technique for Obtaining Axenic Meat", European J. Appl. Microbiol. (1977), 4, 67-73.

Gusev, "Peracetic Acid for *Salmonella* Decontamination in Poultry Carcasses", Veterinary Disease Control Review (2007), 4 pages.

Dom, "Examination of *Salmonella* Decontamination of Broiler Carcasses", (1988), 28 pages.

James et al., "Meat Decontamination", University of Bristol (1997), pp. 1, 8-9, 12, 33-35, 38, 43, 64-91, 98-99 and 104-105.

* cited by examiner

CARCASS FINISH CABINET WITH SPRAY ARBORS AND METHODS THEREOF

CROSS-REFERENCE TO RELATED APPLICATION

The present application claims the benefit of U.S. Provisional Application No. 62/198,796, filed Jul. 30, 2015, which is hereby incorporated herein in its entirety by reference.

TECHNICAL FIELD

The present invention is generally directed to the field of rinsing and cleaning in the meatpacking industry. More specifically, the present invention is directed to a carcass wash cabinet and related methods of operation that improve upon bone dust removal and cleaning with flow rates and liquid waste amounts that are reduced as compared to conventional systems.

BACKGROUND

In the meatpacking industry and specifically in the processing of pork and beef, large carcasses are generally prepared for butchering and further processing by sawing the carcass in half. Typically, the carcass is sawn down the spine to form left and right sides that can be conveyed for further processing. As the carcass is sawn in half, bone dust can be generated that is subsequently deposited onto the left and right sides. Prior to any additional processing steps, it is desired to remove this residual bone dust.

Conventionally, residual bone dust is removed by conveying suspended carcass sides through a carcass wash cabinet. Generally, the carcass wash cabinet includes spray systems mounted on opposed side walls of the carcass wash cabinet. The spray systems utilize water that is sprayed directly onto surfaces of the carcass sides, whereby the fluid flows downward along the surface of the carcass side and carries any residual bone dust off the carcass side and into a drain system within the floor of the carcass wash cabinet.

Subsequent to the carcass washing, the carcasses typically undergo a pasteurization process to kill bacteria and other microbes on the carcass.

While conventional carcass wash cabinets can be successfully utilized to remove residual bone dust from carcass sides, there exists opportunities to improve upon the performance of these carcass wash cabinets. There also exists an opportunity to utilize these washing cabinets in a more effective manner to perform an antimicrobial intervention on the carcass so as to reduce and/or eliminate the need for carcass pasteurization.

SUMMARY

Carcass wash cabinets of the present invention and their related methods of operation improve upon conventional cabinets by offering similar or even better rinse performance using lower volumes of fluid and thus generating less waste. Through the selection and use of spray arbors having a desired spray performance, a carcass side can be exposed to total spray coverage even at reduced fluid flow rates through the spray arbors. By reducing fluid flow rates to the nozzles and increasing pressure, costs are reduced by using lower volumes of water and/or other rinsing chemicals as well as by treating lower volumes of liquid waste that are generated by the carcass wash cabinets of the present invention.

In certain aspects of the present invention, an apparatus is provided that has a plurality of arbors, the plurality of arbors operably connected to a motor system by at least one linkage, and each arbor having apertures for one or more spray nozzles to be attached thereto.

In certain aspects of the present invention, each arbor member generally defines a fluid inlet, an internal fluid channel, and a plurality of spray outlets. Each spray outlet generally defines a spray aperture to which is mounted a nozzle assembly. In certain aspects, the nozzle assembly comprises a spray nozzle having a desired spray pattern and spray rate that can be attached to the spray aperture. In one representative aspect, each spray nozzle can be configured for optimal spray performance at operating conditions including a fluid flow rate of about 0.5 gpm, fluid pressures of between about 50 psi and about 150 psi, more preferably between about 50 psi and about 100 psi, more preferably about 70 psi to about 90 psi, and even more preferably about 80 psi, and spray coverage angles of between about 5° and about 45°, more preferably of between about 10° and about 30° and even more preferably between about 15° and about 25°.

In certain aspects of the present invention, each arbor member generally defines a fluid inlet, an internal fluid channel, and a plurality of spray outlets. Each spray outlet generally defines a spray aperture to which is mounted a nozzle assembly. In certain aspects, the nozzle assembly comprises a spray nozzle having a desired spray pattern and spray rate that can be attached to the spray aperture. In one representative aspect, each spray nozzle can be configured for optimal spray performance at operating conditions including a fluid flow rate between about 0.25 gpm and about 1.0 gpm, more preferably between about 0.35 gpm and about 0.9 gpm, and even more preferably between about 0.35 gpm and about 0.8 gpm, fluid pressures of between about 30 psi and about 150 psi, more preferably between about 50 psi and about 130 psi, more preferably between about 80 psi to about 120 psi, and even more preferably about 80 psi, about 100 psi or about 120 psi, and spray coverage angles of between about 5° and about 45°, more preferably of between about 10° and about 30° and even more preferably between about 15° and about 25°.

In some aspects, the total flow is dependent upon the number of nozzles, which in some aspects is between about 20 nozzles to about 280 nozzles, such that the total flow can be about 5 gpm to about 20 gpm for 20 nozzles up to about 70 gpm to about 280 gpm for 280 nozzles depending upon the pressure, with one of ordinary skill based upon the foregoing appreciating that the total flow will be dependent upon the fluid flow rate for each nozzle and the total number of nozzles to arrive at the total flow.

In certain aspects the spray aperture can comprise a threaded connection to provide for rotatable connection of each nozzle assembly to the corresponding spray aperture. Alternatively, spray aperture can comprise a quick-connect style fitting to allow for quick and easy attachment and replacement of the corresponding nozzle assembly. Still in other embodiments, each nozzle assembly can be permanently attached to the corresponding spray aperture, for example, by welding or soldering wherein individual nozzle tips can be replaced to adjust or otherwise repair the nozzle assembly.

In some aspects of the present invention, the spray fluid comprises a chemical intervention solution comprising at least one peroxycarboxylic acid having between about 2 to 12 carbon atoms, and in some aspects comprises peroxyacetic acid. In some aspects, the peroxycarboxylic acid is an equilibrium peroxycarboxylic acid solution, while in some other aspects the peroxycarboxylic acid is a pH modified peroxycarboxylic acid solution. In some aspects, the intervention solution is between about 10 ppm and about 5000 ppm, in some aspects between about 100 ppm and about 2500 ppm, in some aspects between about 250 ppm and about 1500 ppm, in some aspects between about 300 ppm and about 1000 ppm, in some other aspects between about 350 ppm and about 750 ppm, in some aspects between about 10 ppm and 300 ppm, in some aspects between about 25 ppm and about 100 ppm, in some other aspects between about 50 ppm and about 500 ppm.

In some aspects, the equilibrium peroxycarboxylic acid has a pH above about 3.0 and below about 7.0, in certain aspects a pH range of about 3.5 to about 5.5, and in some other aspects a pH range of about 3.5 to about 5.0. In certain preferred aspects of the present invention, the equilibrium peroxycarboxylic acid comprises peroxyacetic acid.

In some aspects, the intervention solution comprises a pH modified peroxycarboxylic acid. In some aspects, the pH modified peroxycarboxylic acid has a pH above about 7.0 and below about 10.0, in certain aspects a pH range of about 7.0 to about 9.5, and in some other aspects a pH range of about 7.5 to about 9.0. In certain preferred aspects of the present invention, the pH modified peroxycarboxylic acid comprises peroxyacetic acid.

In certain aspects of the present invention, the pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

In some aspects, the interventional solution can be provided at conventional water supply temperatures up to about ambient temperature. For example, water from well or municipal sources can be supplied at temperatures from about 50° F. to about ambient temperatures.

In some aspects, the intervention solution is provided at an elevated temperature between about 100° F. and about 150° F., in certain aspects between about 110° F. and about 140° F., in certain aspects between about 115° F. and about 135° F., in certain aspects between about 120° F. and about 130° F., and in certain aspects between about 122° F. and about 128° F.

In some aspects, the peroxycarboxylic acid solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric acid, peroxycitric acid, and mixtures thereof.

In some aspects, the processing liquid comprises a chemical intervention solution such as, for example, chlorine, bromine, cetylpyridinium chloride (CPC), an organic acid, a peroxycarboxylic acid, trisodium phospate, acidified sodium chlorite, and chlorine dioxide, other appropriate interventional solutions and combinations thereof.

The above summary of the various representative embodiments of the invention is not intended to describe each illustrated embodiment or every implementation of the invention. Rather, the embodiments are chosen and described so that others skilled in the art can appreciate and understand the principles and practices of the invention.

The above summary is not intended to describe each illustrated embodiment or every implementation of the subject matter hereof. The figures and the detailed description that follow more particularly exemplify various embodiments.

BRIEF DESCRIPTION OF THE DRAWINGS

The present invention can be better understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring generally to FIGS. 1-5, 9 and 10, a carcass wash cabinet 100 of the present invention generally comprises a pair of opposed side walls 102a, 102b defining a cabinet entrance 104 and a cabinet exit 106. Generally, an overhead conveyor 108 operates in a direction from the cabinet entrance 104 to the cabinet exit 106 and typically includes a plurality of suspended hooks 110 from which carcass sides 112 are hung. Each of the opposed side walls 102a, 102b generally comprises an upper portion 114, a middle portion 115 and a lower portion 116. The upper portion 114 can be angled inwardly toward the carcass sides 112, the middle portion 115 can reside in a substantially perpendicular orientation to a floor 120 and the lower portion 116 can be angled inwardly toward the carcass sides 112. In other aspects, the upper portion 114 can be angled inwardly toward the carcass sides 112, with the middle and lower portions 115, 116 residing in a substantially perpendicular orientation to the floor 120. Each of the opposed side walls 102a, 102 further comprises a spray system 122. When viewed from the cabinet entrance 104 or cabinet exit 106, the opposed side walls 102a, 102b including their corresponding spray system 122 are essentially mirror images of one another. In this way, carcass wash cabinet 100 can be configures such that the spray systems 122 on each side wall 102a, 102b generally provide the same or very similar spray coverage on opposite sides of the carcass side 112 or alternatively, the spray system 122 for each side wall 102a, 102b can be tailored for different spray performance, for instance, front and backs of the carcass side 112.

Figure 1:
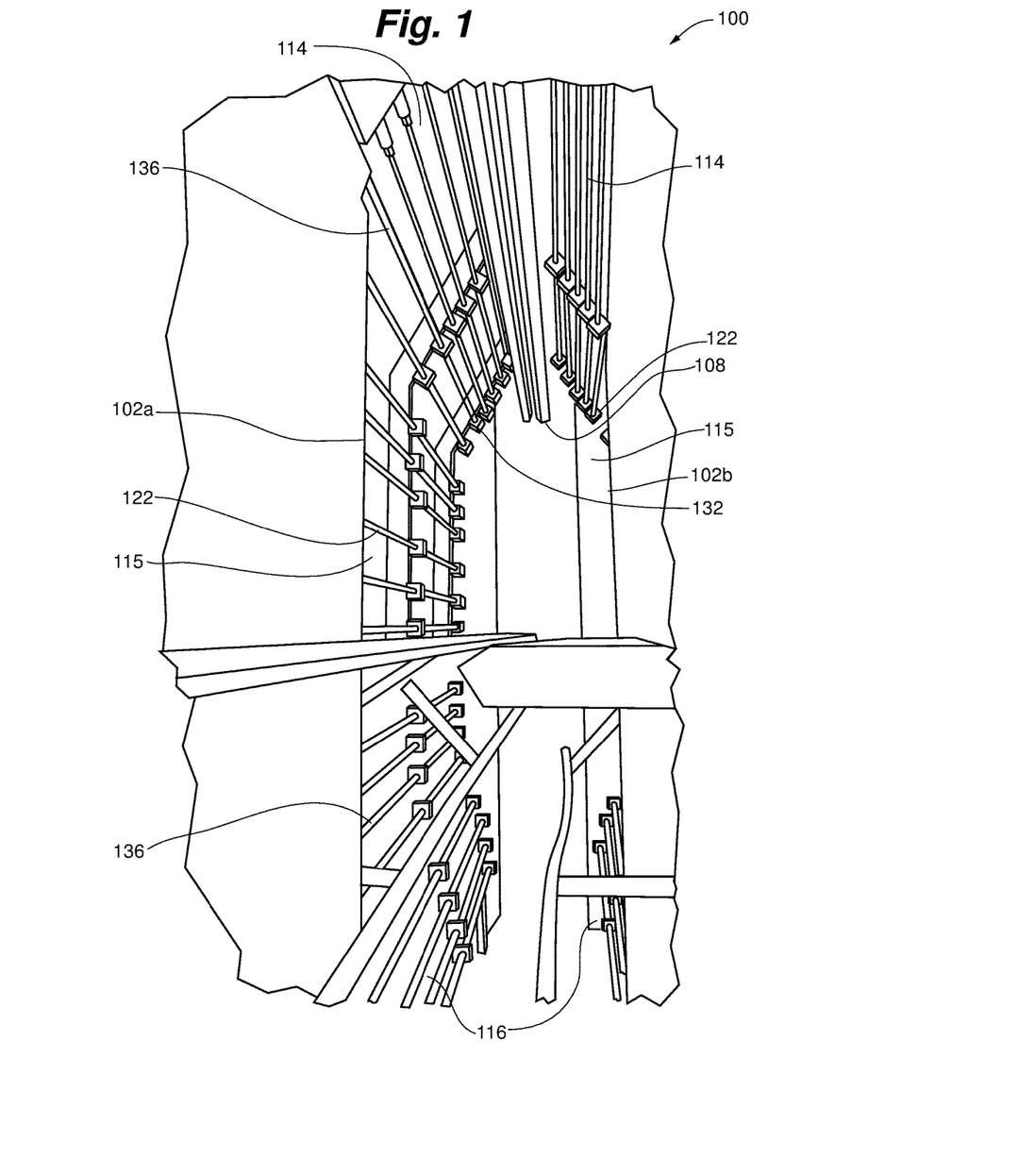
FIG. 1 is an end view of a carcass wash cabinet according to a representative embodiment of the present invention.
Figure 2:
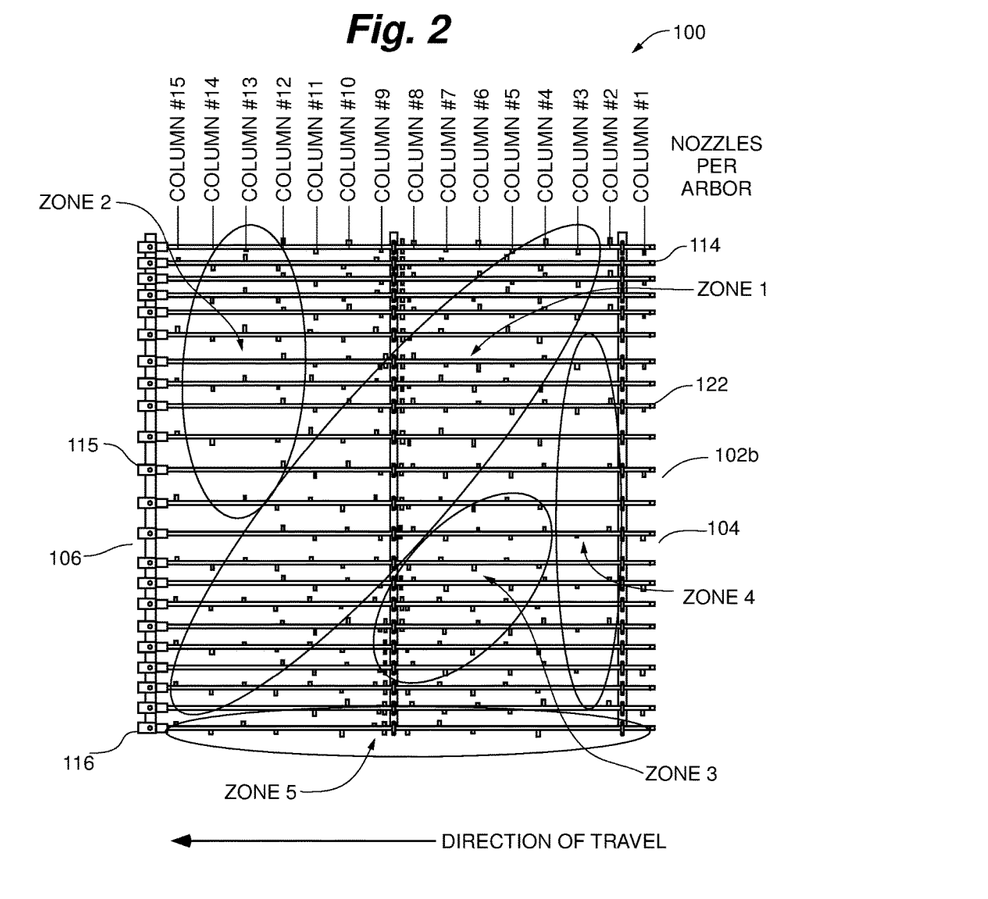
FIG. 2 is side view of a spray system on a wall of the carcass wash cabinet of FIG. 1, the spray system having five zones of spray coverage for the respective carcass according to certain aspects of the present invention.
Figure 3:
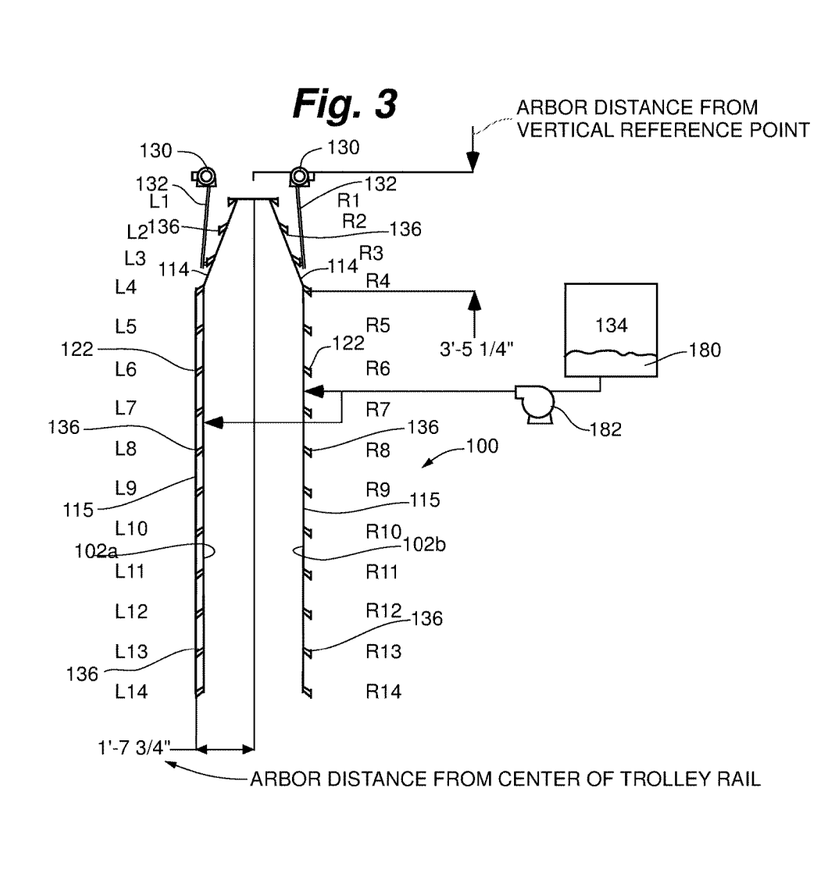
FIG. 3 is an end view of the carcass wash cabinet of FIG. 1 illustrating upper and middle portions of the spray system of FIG. 2.
Figure 4:
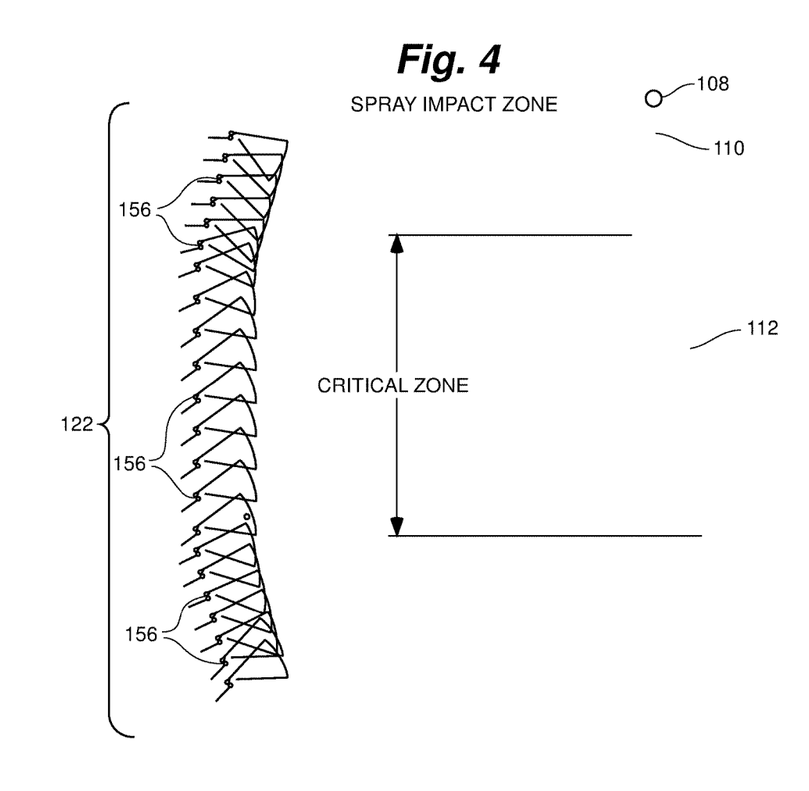
FIG. 4 is side view of the spray system of FIG. 2 illustrating spray impact zones.

With reference to FIGS. 1 and 3, each spray system 122 generally comprises a motor 130, a linkage member 132, a fluid supply 134 and a plurality of arbor members 136. Typically, each motor 130 is mounted at a highest point of or above the upper portion 114. In some preferred embodiments, the motor 130 is located above the overhead conveyor 108 so as to limit exposure of the motor 130 to any spray. Generally, the linkage member 132 is connected to the motor 130 and extends downward along the upper portion 114, middle portion 115 and lower portion 116. In some embodiments, the linkage member 132 can comprise a chain that is operably coupled to a sprocket or gear on the motor 130. Each arbor member 136 is individually mounted in a spaced apart orientation along the upper portion 114, middle portion 115 and upper portion 116 of the side walls 102a, 102b. As illustrated, each arbor member 136 is mounted in a generally horizontal, spaced apart operation such the individual arbor members 136 reside in an essentially parallel orientation to one another. Alternatively, arbor members 136 can be mounted in a generally vertical orientation with respect to one another. In yet other embodiments, arbor members 136 may be mounted in a combination of horizontal and vertical orientations. Each arbor member 136 can comprise an arbor coupler 138 for rotatably coupling the arbor members 136 to the linkage member 132. In the case of the linkage member 132 comprising a chain, the arbor members 136 can comprise a gear/sprocket that communicates the rotation of a motor shaft to each arbor member 132. In one presently preferred embodiment, each spray system 122 includes twenty two arbor members 136, though it will be understood that the number of arbor members 136 can increase or decrease based upon a size of the carcass side 112, such as between about 10 to about 40 arbor members 136, with subranges within the foregoing range contemplated.

Figure 5:
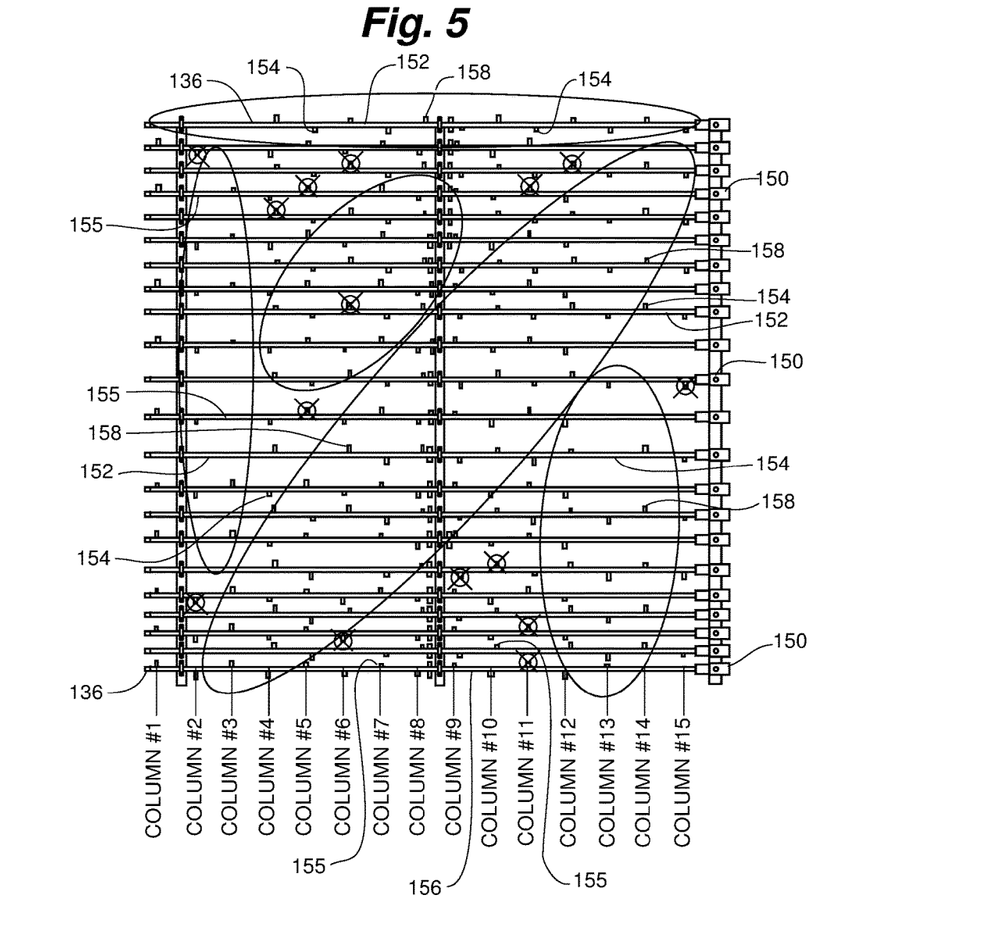
FIG. 5 is a side view of the spray system of FIG. 2.

As shown in FIG. 5, each arbor member 136 generally defines a fluid inlet 150, an internal fluid channel 152 and a plurality of spray outlets 154. Each spray outlet 154 generally defines a spray aperture 155 to which is mounted a nozzle assembly 156. In a simplest form, the nozzle assembly 156 comprises a spray nozzle 158 having a desired spray pattern and spray rate that can be attached to the spray aperture 155. In one representative embodiment, each spray nozzle 158 can be configured for optimal spray performance at operating conditions including a fluid flow rate of about 0.25 gpm to about 5 gpm, more preferably about 0.25 gmp to about 3 gpm, more preferably about 0.25 gmp to about 1 gpm, more preferably between about 0.35 gpm and about 0.9 gpm, and even more preferably between about 0.35 gpm and about 0.8 gpm, and with fluid pressures of between about 30 psi and about 150 psi, more preferably between about 50 psi and about 130 psi, more preferably between about 80 psi to about 120 psi, and even more preferably about 80 psi, about 100 psi or about 120 psi, and spray coverage angles of between about 5° and about 45°, more preferably between about 10° and about 30°, and even more preferably between about 15° and about 25°.

The total number of nozzles in a carcass wash cabinet 100 can range from about 20 nozzles to about 280 nozzles, such that the total flow can be about 5 gpm to about 20 gpm for 20 nozzles up to about 70 gpm to about 280 gpm for 280 nozzles depending upon the pressure, with one of ordinary skill based upon the foregoing appreciating that the total flow will be dependent upon the fluid flow rate for each nozzle and the total number of nozzles to arrive at the total flow.

In some aspects, spray aperture 155 can comprise a threaded connection to provide for rotatable connection of each nozzle assembly 156 to the corresponding spray aperture 155. Alternatively, spray aperture 155 can comprise a quick-connect style fitting to allow for quick and easy attachment and replacement of the corresponding nozzle assembly 156. In other aspects, nozzle assembly 156 can be welded or soldered to the respective arbor member 136.

Figure 6:
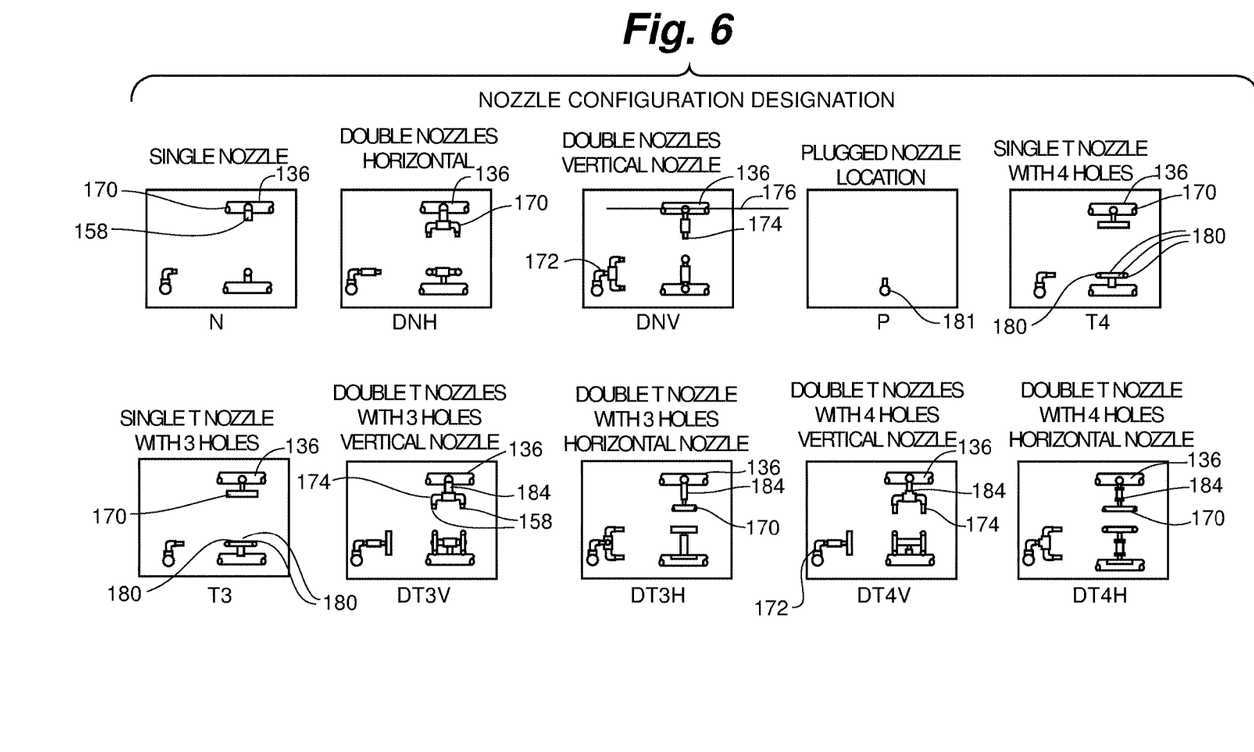
FIG. 6 is an illustration of nozzle configurations according to representative embodiments of the present invention.

In other representative embodiments as shown in FIG. 6, nozzle assembly 156 can comprise any of a variety of fittings, couplings and tubing for varying spray performance at individual spray apertures 155 along each arbor member 136. For instance, a single spray nozzle 158 can be directly mounted to the spray aperture 155 in a horizontal configuration 170 or through the use of an elbow coupling 172, the spray nozzle 158 can have a vertical configuration 174 relative to an arbor plane 176. In some instances, nozzle assembly 156 can comprise a single T-nozzle 178 having a plurality of nozzle openings 180, for example, 2, 3, 4, or 5 nozzle openings 180 with each nozzle opening 180 dispensing its own spray. In yet other alternative embodiments, a T-member 184 can be mounted directly to the spray aperture 155 such that two spray nozzles 158 can be attached in either the horizontal configuration 170 or the vertical configuration 174 if elbow couplings 172 are utilized. In order to customize spray performance, it may be desirable to use a plug 181 to close off certain spray apertures 155. Through the use of the various nozzle configurations, fittings and couplings, spray performance at each spray aperture 155 can be customized such that spray coverage is optimized with respect to carcass side 112. In addition, any changes in either the type or size of the carcass side 112 can be addressed by sampling altering individual nozzle assemblies 156 along each arbor member 136.

Fluid supply 134 generally comprises a fluid source 180 and a fluid pump 182 as seen in FIG. 3. The fluid source 180 can comprise a mixing or storage tank or can comprise a direct connection to a potable water source, for example, a municipal or well water supply. In some embodiments, the fluid source 180 can solely comprise potable water such that carcass sides 112 are exposed to and rinsed only with water such that the function of the carcass wash cabinet 100 is merely the removal of bone dust and soil. Alternatively, the fluid source 180 can comprise a solution of water, for example, potable or reuse/recycle water and treatment chemicals both for rinsing bone dust and soil as well as performing an antimicrobial intervention to reduce the population of bacteria, other microbes and pathogens on the carcass sides 112. When fluid source 180 comprises a solution, the solution can be prepared and mixed within a mixing tank or alternatively, chemical dosing pumps or other chemical injector system can be utilized to introduce the treatment chemical into a potable water stream. Generally, the fluid pump 182 pressurizes and supplies the fluid to each spray system 122 at the optimized flow rates and pressures for the spray nozzles 158. Typically the fluid pump 182 will operate at the direction of a control system or circuitry that ensures that fluid is supplied to the spray systems 122 whenever the overhead conveyor 108 is operating.

In the event that the fluid source 180 comprises one or more treatment chemicals, these chemicals can be a chemical intervention solution comprising at least one peroxycarboxylic acid having between about 2 to 12 carbon atoms, and in some aspects comprises peroxyacetic acid. In some aspects, the peroxycarboxylic acid is an equilibrium peroxycarboxylic acid solution, while in some other aspects the peroxycarboxylic acid is a pH modified peroxycarboxylic acid solution. In some aspects, the intervention solution is between about 10 ppm and about 5000 ppm, in some aspects between about 100 ppm and about 2500 ppm, in some aspects between about 250 ppm and about 1500 ppm, in some aspects between about 300 ppm and about 1000 ppm, in some other aspects between about 350 ppm and about 750 ppm, in some aspects between about 10 ppm and 300 ppm, in some aspects between about 25 ppm and about 100 ppm, in some other aspects between about 50 ppm and about 500 ppm.

In some aspects, the equilibrium peroxycarboxylic acid has a pH above about 3.0 and below about 7.0, in certain aspects a pH range of about 3.5 to about 5.5, and in some other aspects a pH range of about 3.5 to about 5.0. In certain preferred aspects of the present invention, the equilibrium peroxycarboxylic acid comprises peroxyacetic acid.

In some aspects, the intervention solution comprises a pH modified peroxycarboxylic acid. In some aspects, the pH modified peroxycarboxylic acid has a pH above about 7.0 and below about 10.0, in certain aspects a pH range of about 7.0 to about 9.5, and in some other aspects a pH range of about 7.5 to about 9.0. In certain preferred aspects of the present invention, the pH modified peroxycarboxylic acid comprises peroxyacetic acid.

In certain aspects of the present invention, the pH modified peroxycarboxylic acid is prepared using at least one buffering agent, said at least one buffering agent chosen from sodium hydroxide, potassium hydroxide, sodium salts of carbonic acid, potassium salts of carbonic acid, phosphoric acid, silicic acid and combinations thereof.

In some aspects, the intervention solution is provided at an elevated temperature between about 100° F. and about 150° F., in certain aspects between about 110° F. and about 140° F., in certain aspects between about 115° F. and about 135° F., in certain aspects between about 120° F. and about 130° F., and in certain aspects between about 122° F. and about 128° F.

In some aspects, the peroxycarboxylic acid solution is chosen from peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric acid, peroxycitric acid, and mixtures thereof.

In some aspects, the processing liquid comprises a chemical intervention solution chosen from chlorine, bromine, cetylpyridinium chloride (CPC), an organic acid, a peroxycarboxylic acid, trisodium phospate, acidified sodium chlorite, and chlorine dioxide.

A representative carcass wash cabinet 100 for use in the processing of Holstein carcass sides 112 is shown in FIGS. 1-5, 9 and 10. Generally, the carcass wash cabinet 100 includes a left-side spray system 122 (labeled as "L") and a right-side spray system 122 (labeled as "R"). Each of the left and right-side spray systems includes twenty two arbor members 136 that are arranged horizontally with respect to the floor 120 and generally parallel with respect to each other. The individual arbor members 136 are individually numbered beginning with a topmost arbor member referred as either "L1" or "R1" depending upon the side and proceeding sequentially downward to a bottommost arbor member 136 numbered as "L22" or "R22" respectively. The left and right-side spray systems 122 are configured with the top four arbor members (L1-L4 and R1-R4) mounted to the upper portion 114, the middle thirteen arbor members 136 (L5-L17 and R5-R17) mounted to the middle portion 115 and the lower five arbor members (L18-L22 and R18-R22) mounted to the lower portion 116. As depicted, each arbor member 136 includes nine spaced apart spray outlets 154. As illustrated, six of the spaced apart spray outlets 154 on each arbor member 136 include nozzle assemblies 156 while three of the spaced apart spray outlets 154 are plugged with a plug member 200.

Figure 7:
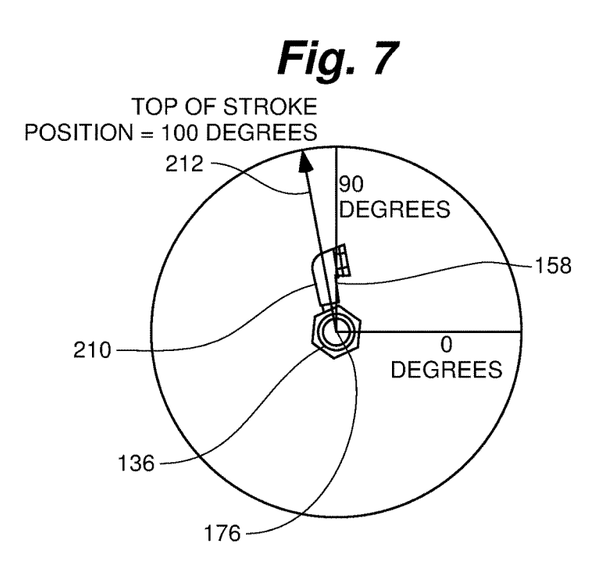
FIG. 7 is an end view of an arbor member in a top of stroke position according to a representative embodiment of the present invention.
Figure 8:
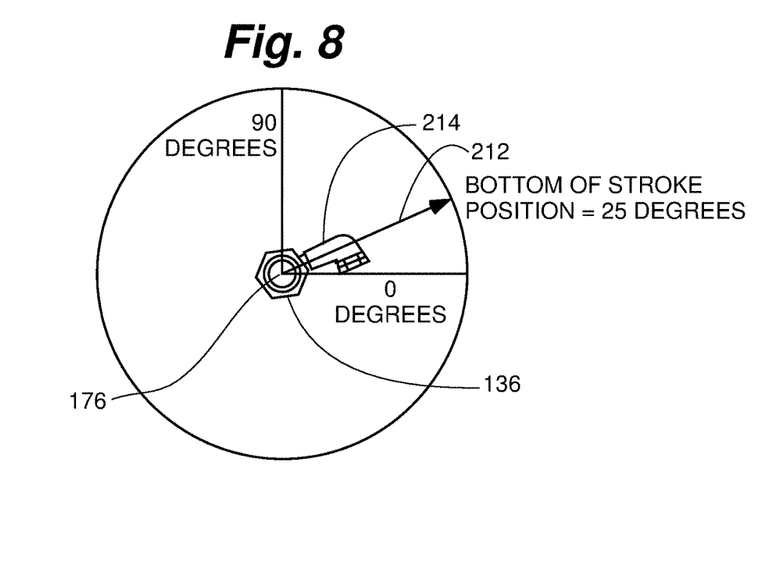
FIG. 8 is an end view of an arbor member in a bottom of stroke position according to a representative embodiment of the present invention.
Figure 9:
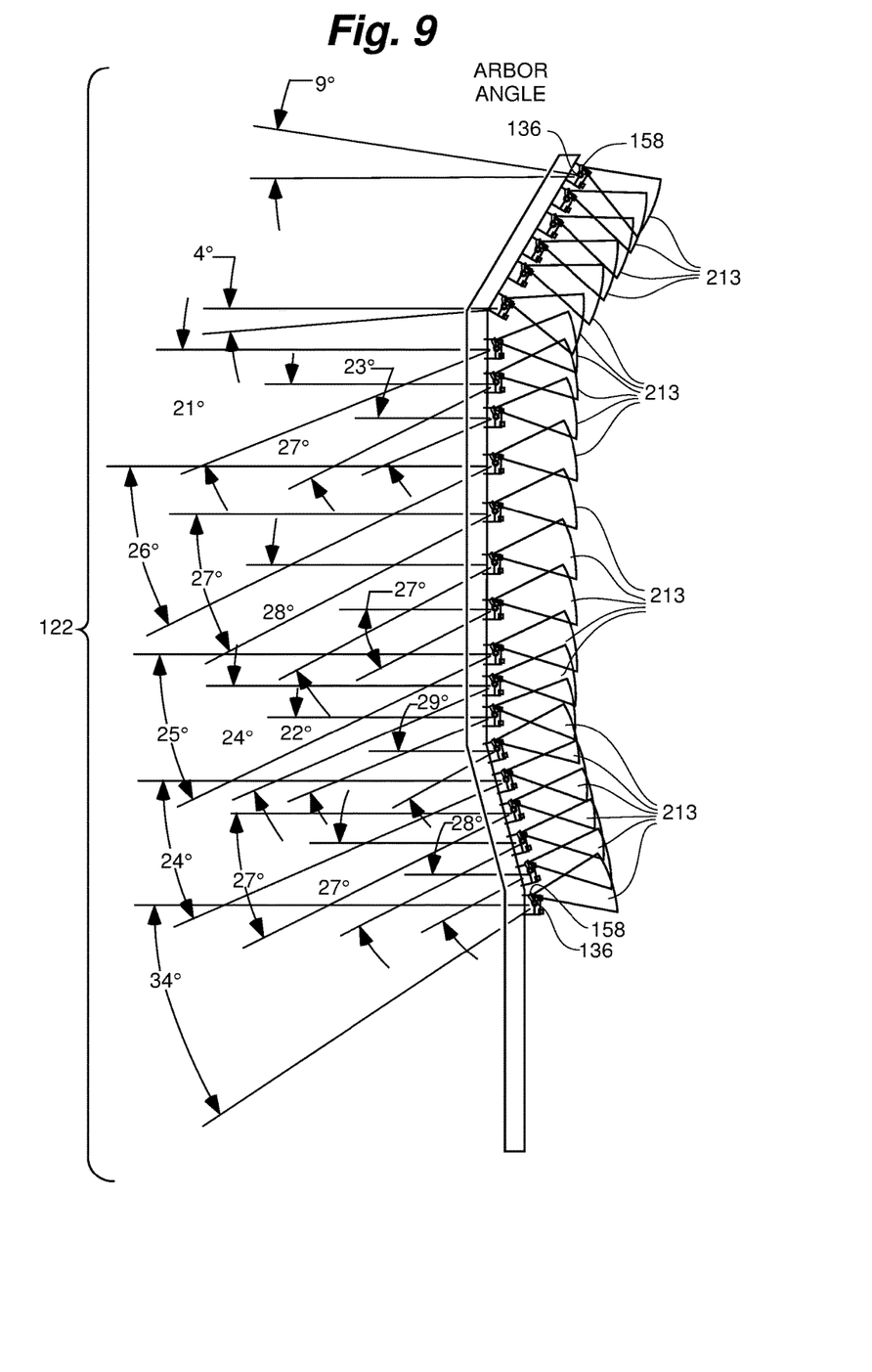
FIG. 9 is a side view of the spray system of FIG. 2 illustrating spray impact zones according to a representative embodiment of the present invention.
Figure 10:
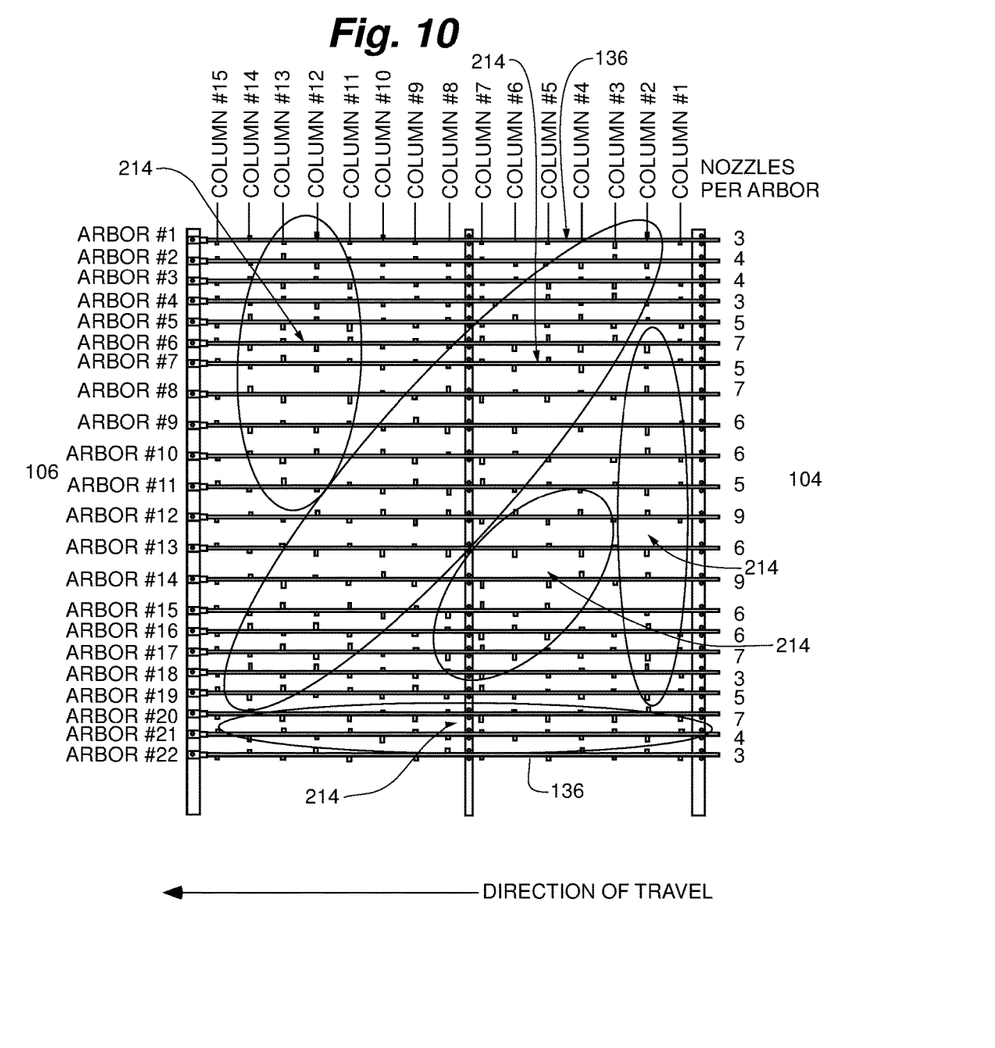
FIG. 10 is a side view of the spray system of FIG. 2 illustrating overlapping spray zones within the carcass wash cabinet of FIG. 1 according to a representative embodiment of the present invention.

Each nozzle assembly 156 regardless of configuration is mounted to the corresponding spray outlet 154 such that when the arbor members 136 are rotated by the motor 130 to an uppermost spray position 210 as shown in FIG. 7, a central nozzle axis 212 is positioned at 100 degrees relative to a horizontal axis while when the arbor members 136 are rotated by the motor 130 to a lowermost spray position 242 as shown in FIG. 8, the central nozzle axis 212 is positioned at 25 degrees relative to the horizontal axis. As the various arbor members 136 traverse between the uppermost spray position 210 and the lowermost spray position 214, each arbor member 136 defines a spray impact zone 213 as shown in FIG. 9 such that in combination, each of the left and right side spray systems 122 define overlapping spray coverage zones 214 along the length of the carcass wash cabinet 100 as shown in FIG. 10. In this way, every point on carcass 112 that traverses carcass wash cabinet 100 is exposed to spray from multiple nozzle assemblies 156 to ensure that any dust or other contaminants are rinsed from the carcass and in some embodiments, every portion of the carcass 112 is exposed to appropriate intervention chemicals to reduce the level of any pathogens.

In certain aspects during operation, the spray fluid is applied to the carcass by the carcass wash cabinet 100, such that the spray fluid constantly flows through the respective arbor members 136 and spray nozzles 158 during the down stroke and up stroke. In some aspects, the down stroke and the up stroke have about the same rate, while in certain other aspects, the down stroke provides a slow rate while the up stroke is faster than the down stroke. In some aspects, the spray fluid can be shut off on the up stroke to further conserve water and any chemical intervention solution applied by the carcass wash cabinet 100.

In some aspects, the spray fluid contains a chemical intervention solution such that the meatpacking process can get rid of a subsequent pasteurization cabinet for microbial removal. In such situations, the carcass wash cabinet 100 functions as both a wash cabinet and a microbial removal cabinet. This removal of the pasteurization cabinet provides the meatpacking plant with savings on both water and energy, as pasteurization cabinet often utilize 180 water for killing surface pathogens.

In some aspects, the total spray fluid rate through the cabinet is about 5 gpm to about 600 gpm, more preferably about 5 gpm to about 300 gpm, more preferably about 5 gpm to about 240 gpm.

Figure 11:
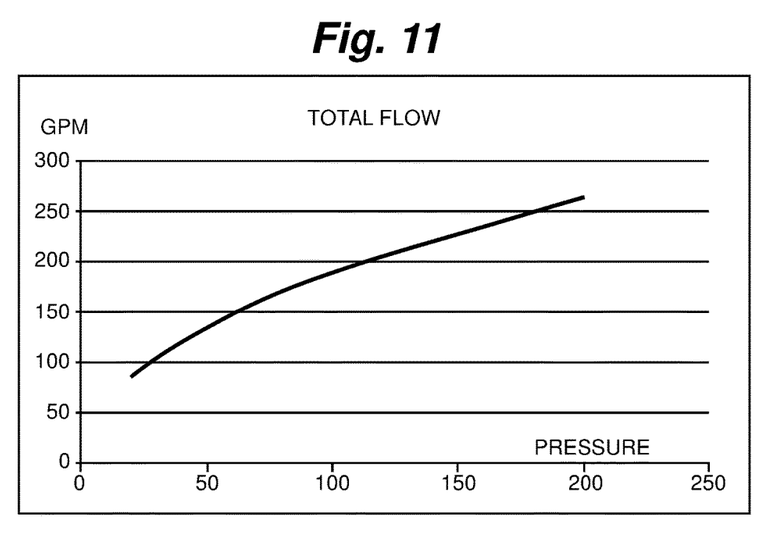
FIG. 11 is a graph illustrating the total flow through a cabinet having 240 nozzles, which is dependent upon the pressure and flow rate of each nozzle, according to a representative embodiment of the present invention.

Referring now to FIG. 11, a carcass wash cabinet 100 according to a representative containing 240 nozzles can have a total flow that is dependent upon the pressure and flow rate through each nozzle, as shown by representative data in Table 1.

TABLE 1

Total Flow of 240 nozzle carcass wash cabinet.

| Pressure | GPM/Nozzle | Total Flow |
|---|---|---|
| 20 | 0.35 | 84 |
| 30 | 0.43 | 103.2 |
| 40 | 0.50 | 120 |
| 60 | 0.61 | 146.4 |
| 80 | 0.71 | 170.4 |
| 100 | 0.79 | 189.6 |
| 200 | 1.10 | 264 |

One of ordinary skill in the art will appreciate that the total flow in a carcass wash cabinet 100 will be dependent upon the total number of nozzles, the pressure and the flow rate of each nozzle. For example, a carcass wash cabinet 100 having 20 nozzles with a flow rate at each nozzle of about 0.25 gpm will have a total flow of about 5 gpm while a flow rate at each nozzle of about 1.0 gpm will have a total flow of about 20 gpm. Similarly, a carcass wash cabinet 100 having 240 nozzles with a flow rate at each nozzle of about 0.25 gpm will have a total flow of about 60 gpm while a flow rate at each nozzle of about 1.0 gpm will have a total flow of about 240 gpm. In certain aspects, the total number of nozzles in a carcass wash cabinet 100 is between about 20 nozzles up to about 280 nozzles.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. A carcass wash cabinet, comprising:
a cabinet including a pair of opposed side walls defining an entrance and an exit;
a conveyor for carrying a carcass into the entrance and out the exit;
a fluid supply; and
a pair of spray systems fluidly coupled to the fluid supply, each spray system being operably mounted on the corresponding side wall, each spray system including a plurality of arbor members, wherein each arbor member includes an internal fluid channel having a plurality of spray outlets, wherein a plurality of nozzle assemblies are selectively, fluidly coupled to the spray outlets for spraying the fluid supply in a desired spray pattern at fluid flow rate between about 0.25 gpm and about 1.0 gpm with a fluid pressure between about 30 psi and about 150 psi.

2. The carcass wash cabinet of claim 1, wherein the plurality of nozzle assemblies is between about 20 nozzles and about 280 nozzles.

3. The carcass wash cabinet of claim 1, wherein each nozzle assembly has an optimal spray performance at operating conditions of a fluid flow rate between about 0.35 gpm and about 0.8 gpm with a fluid pressure between about 65 and about 130 psi.

4. The carcass wash cabinet of claim 3, wherein each spray system includes an upper portion, a middle portion and a lower portion, wherein the middle portion resides perpendicular to a cabinet floor and the upper portion and the lower portion are angled inwardly toward the carcass.

5. The carcass wash cabinet of claim 3, wherein each spray system further comprises a motor and a linkage member, whereby the linkage member mechanically interconnects the motor to each arbor.

6. The carcass wash cabinet of claim 3, wherein the fluid supply comprises water, said water being selected from potable water, reuse water and recycle water.

7. The carcass wash cabinet of claim 6, wherein the fluid supply further comprises an intervention chemical.

8. The carcass wash cabinet of claim 7, wherein the intervention chemical is selected from the group consisting essentially of: chlorine, bromine, cetylpyridinium chloride (CPC), an organic acid, a peroxycarboxylic acid, trisodium phospate, acidified sodium chlorite, chlorine dioxide and combinations thereof.

9. The carcass wash cabinet of claim 7, wherein the intervention chemical comprises a peroxycarboxylic acid solution that is selected from the group consisting essentially of: peroxyformic, peroxypropionic, peroxyacetic, peroxybutanoic, peroxypentanoic, peroxyhexanoic, peroxyheptanoic, peroxyoctanoic, peroxynonanoic, peroxydecanoic, peroxyundecanoic, peroxydodecanoic, peroxylactic, peroxymaleic, peroxyascorbic, peroxyhydroxyacetic, peroxyoxalic, peroxymalonic, peroxysuccinic, peroxyglutaric, peroxyadipic, peroxypimelic, peroxysubric acid, peroxycitric acid, and mixtures thereof.

10. The carcass wash cabinet of claim 7, wherein the intervention chemical comprises at least one peroxycarboxylic acid having between about 2 to about 12 carbon atoms.

11. The carcass wash cabinet of claim 7, wherein the intervention chemical is present within the fluid supply at a concentration of about 10 ppm to about 5000 ppm.

12. The carcass wash cabinet of claim 3, wherein the fluid supply is provided at an elevated temperature between about 100° F. and about 150° F.

13. The carcass wash cabinet of claim 3, wherein each arbor member rotates between an uppermost spray position and a lowermost spray position.

14. The carcass wash cabinet of claim 13, wherein a central nozzle axis of each nozzle assembly is positioned at 100 degrees relative to a horizontal axis when the corresponding arbor member is in the uppermost spray position.

15. The carcass wash cabinet of claim 13, wherein a central nozzle axis of each nozzle assembly is positioned at 25 degrees relative to a horizontal axis when the corresponding arbor member is in the lowermost spray position.

16. The carcass wash cabinet of claim 1, wherein each nozzle assembly has an optimal spray performance at operating conditions of a fluid flow rate of about 0.35 gpm and about 0.9 gpm with a fluid pressure of between about 50 psi to about 150 psi and a spray coverage angle of between about 5° to about 45°.

17. The carcass wash cabinet of claim 16, wherein the fluid pressure for optimal spray performance of each nozzle assembly is between about 80 psi and about 120 psi.

18. The carcass wash cabinet of claim 16, wherein the spray coverage angle or optimal spray performance of each nozzle assembly is between about 10° to about 30°.

19. The carcass wash cabinet of claim 16, wherein the spray coverage angle or optimal spray performance of each nozzle assembly is between about 15° to about 25°.

20. A method of removing bone dust from a carcass, the method comprising:
applying a wash solution to the carcass in a carcass wash cabinet;
wherein the carcass wash cabinet comprises a pair of opposed side walls defining an entrance and an exit, a conveyor for carrying the carcass into the entrance and out the exit, a a fluid supply to the wash solution, and a pair of spray systems fluidly coupled to the fluid supply, each spray system being operably mounted on the corresponding side wall, each spray system including a plurality of arbor members, wherein each arbor member includes an internal fluid channel having a plurality of spray outlets, wherein a plurality of nozzle assemblies are selectively, fluidly coupled to the spray outlets for spraying the fluid supply in a desired spray pattern at a fluid flow rate between about 0.25 gpm and about 1.0 gpm with a fluid pressure between about 30 psi and about 150 psi.

* * * * *